US005104731A

United States Patent [19]

Gager

[11] Patent Number: 5,104,731

[45] Date of Patent: Apr. 14, 1992

[54] DRY TONER IMAGING FILMS POSSESSING AN ANTI-STATIC MATRIX LAYER

[75] Inventor: Morgan E. Gager, Warwick, R.I.

[73] Assignee: Arkwright Incorporated, Fiskeville, R.I.

[21] Appl. No.: 572,131

[22] Filed: Aug. 24, 1990

[51] Int. Cl.[5] .............. B32B 9/00

[52] U.S. Cl. .............. 428/323; 428/195; 428/327; 428/328; 428/411.1; 252/500; 252/512; 252/520; 346/1.1

[58] Field of Search .............. 428/195, 323, 411.1, 428/328, 327; 346/1.1; 252/500, 512, 520

[56] References Cited

U.S. PATENT DOCUMENTS

| | | | |
|---|---|---|---|
| 4,071,362 | 1/1978 | Takenaka et al. | 430/104 |
| 4,415,626 | 11/1983 | Hasenauer et al. | 428/409 |
| 4,526,847 | 7/1985 | Walker et al. | 430/18 |
| 4,621,009 | 11/1986 | Lad | 428/216 |

FOREIGN PATENT DOCUMENTS 57-129445 8/1982 Japan .

*Primary Examiner*—Patrick J. Ryan

*Attorney, Agent, or Firm*—Birch, Stewart, Kolasch & Birch

[57] ABSTRACT

Advantageous dry toner imaging film media, having good toner affinity, anti-static properties, embossing resistance, and which reliably feed through electrophotographic copiers and printers are disclosed. The media comprise suitable polymeric substrates, having an anti-static, matrix layer coated thereon. The matrix layer comprises a mixture of at least one thermoplastic polymer having a Tg of 5°-75° C. and possessing good toner adhesion properties, and at least one crosslinked polymer, possessing hot fuser roll embossing resistant properties, wherein at least one polymer in said matrix layer is electrically conductive. Electrophotographic processes, utilizing the film media, are also disclosed.

34 Claims, No Drawings

DRY TONER IMAGING FILMS POSSESSING AN ANTI-STATIC MATRIX LAYER

FIELD OF THE INVENTION

The present invention relates to a film medium for use in a dry toner imaging process having an anti-static matrix layer thereon, comprising a mixture of at least one thermoplastic polymer and at least one cross-linked polymer, which layer possesses hot fuser roll embossing resistant properties and improved toner adhesion characteristics. The invention also relates to copying and printing processes which utilize such copying and printing media.

BACKGROUND OF THE INVENTION

The art of dry toner imaging is presently well developed and provides the basis of most office copying and printing systems in use today. The electrophotographic process is the most prevalent method of dry toner imaging. Electrophotographic copiers and printers normally employ five steps in the imaging process. The individual steps of the electrophotographic process include the following: (1) a uniform electric charge is deposited on a photoconductor drum or belt in the dark; (2) an electrostatic latent image is then created on the photoconductor by exposing the photoconductor to a pattern of light; (3) the photoconductor is then exposed to toner particles, wherein toner particles having the correct polarity are adhered to the latent image area; (4) a medium to be printed is then passed between the photoconductor and a transfer corona to cause the toner particles to transfer from the photoconductor to the medium; and (5) the transferred toner particles are then fixed to the medium by one of various procedures known in the art.

One important use of electrophotographic copiers and printers involves their use in making overhead projection transparencies. When preparing transparencies on electrophotographic copiers and printers, it is not only important that the transparent receptor film media reliably feed through the electrophotographic copying and printing machine utilized, but also that the receptive film media be able to provide good image quality and toner adhesion, while at the same time being resistant to hot fuser roll embossing to give a clear background.

There are many makes and models of copiers and printers on the market, which can produce images on opaque or transparent film substrates, utilizing electrophotographic processes, such as outlined above. During such electrophotographic processes, it is required that an image be fixed to the film substrate (see step 5 above). In such a fixing step, fixation of the image toner generally occurs by applying heat and pressure to rollers between which the imaged medium must pass, so as to bond the image to the film medium utilized. For higher speed copiers and printers, the speed with which the fixing step is completed often results in poor toner or image adhesion. On the other hand, with low speed hot fusing copiers and printers, low speeds can provide good image adhesion, but can also emboss the surface of the receptive film, thereby impairing its use as a transparency.

Embossing in the instance of transparent films is particularly undesirable as the embossing pattern often projects as a gray background on overhead projection screens, thereby reducing image contrast and the readability of the overhead transparency's projected image.

Measures utilized to prevent embossing, heretofore have usually involved the use of crosslinking systems, to harden the soft resin binders, normally employed in receptor sheet surface coatings. However, such conventional crosslinking also reduces image bonding and therefore, image adhesion, so that poor quality overhead transparencies are still obtained. This is especially true if a high speed copier is utilized to prepare such imaged transparencies.

Thermoplastic resins having a high glass transition temperature (Tg), have also been utilized to resolve embossing problems. However, the use of such thermoplastic resins has often resulted in the problem of poor toner adhesion. Thus, when utilizing such high glass transition temperature thermoplastic resins, there is often encountered the classical problem of unfavorable tradeoffs, wherein one desirable quality is obtained at the expense of another.

Electrophotographic image processing may often be accompanied by transport problems of the copying media through the electrophotographic copier or printer. Such transport problems are manifested by the occurrence of multiple feeds, jams, or stacking problems in the copiers and printers. These problems are increasingly more pronounced, as copying and printing speeds become faster, often due to static build-up on the surface of the film utilized.

The use of conventional liquid anti-static agents to help provide reliable film transport in electrophotographic copiers and printers, have heretofore often reduced toner adhesion to imaging films, resulting in image loss during the handling or use thereof. Moreover, conventional liquid anti-static agents can often migrate from the surface of such film substrates, so that the occurrence of multiple feeds or jams, can still be relatively commonplace, even when conventional anti-static agents are utilized. Examples of said liquid antistats are Cyanamid's Cyastat 609 and SN.

A review of the prior art illustrates the problems in achieving the required balance of properties.

U.S. Pat. No. 4,071,362 pertains to a process for electrophotographic copying and printing in which the media have improved toner receptivity and reduced double feeding. While its objectives have some similarity to those of the present invention, the composition is different and less effective. This prior art utilizes a thermoplastic polymer(s), which is said to provide good toner adhesion. An important difference from the present invention is that it employs no crosslinking polymeric system. Another difference is its use of a non-polymeric anti-stat agent on the side opposite to the imaging side of the film.

U.S. Pat. No. 4,415,626 pertains to electrographic copying and printing media which during the imaging process are less likely to stick to one another or jam in electrographic copier/duplicator equipment. This prior art teaches the preferable use of a single polymer which is hardened by means of a Werner chromium complex. Its anti-static receiving layer does not employ a separate polymer of low Tg to achieve superior toner bonding and also requires a charge control agent.

A study of the related art described above shows that it did not consider the need for a single film product which possesses both superior toner adhesion required by today's high speed copiers and printers and embossing resistance required by slow hot fusing copiers and printers.

In contrast to the related art, the present invention uses a combination of thermoplastic polymer selected to provide superior toner adhesion and thermosetting polymer selected to provide embossing resistance. Thus, the qualities of toner adhesion and embossing resistance can be independently and optimally imparted. Further, the intermingling of the two polymers to form a matrix provides a unique ability to enhance these desired qualities. A further novel feature of the present invention is that it allows for the use of an electrically conductive polymer which may be cross-linkable. Thus, in the present invention two separate and desirable properties can be achieved with a single polymer, namely embossing resistance and conductivity.

SUMMARY OF THE INVENTION

One object of the present invention is to provide a dry toner imaging media, comprising a transparent or opaque polymeric substrate, having on at least one side thereof a layer, which improves dry toner adhesion to the substrate, reduces electrostatic charge build-up, and resists embossing by hot fuser rollers.

It is also an object of the present invention to provide for transparent and opaque dry toner imaging film media, which reliably transport through various copiers and printers, while providing good image quality. Such results are obtained, whether or not imaging of the films occurs utilizing a fast electrophotographic copier or a slow, hot fuser electrophotographic copier.

It is also an object of the present invention to provide an electrophotographic copying process, whereby imaging of the copying and printing media of the present invention occurs.

In contemplation of the above objects, the present invention provides a film medium, useful in a dry toner imaging process, the film medium comprising a transparent or opaque polymeric substrate, having on at least one side a matrix layer, having resistance to blocking at 78° C. after 30 minutes and having a surface resistivity of from about $1\times10^8$ to about $1\times10^{14}$ ohms per square when measured at 20° C. and 50% relative humidity, the matrix layer comprising a mixture of at least one thermoplastic polymer having a Tg of 5° to 75° C. and possessing good dry toner adhesive properties and at least one crosslinked polymer possessing hot fuser roll embossing resistant properties, wherein at least one polymer in said matrix layer is electrically conductive.

In further contemplation of the above objects, the present invention also provides a film medium, useful in a dry toner imaging process, the film medium comprising a transparent or opaque polymeric substrate, having on at least one side thereof a matrix layer having a resistance to blocking at 78° C. after 30 minutes and having a surface resistivity of from about $1\times10^8$ to about $1\times10^{14}$ ohms per square when measured at 20° C. and 50% relative humidity, said matrix layer comprising a non-polymeric electrically conductive agent, a mixture of at least one thermoplastic polymer having a Tg of from 5° to 75° C. and possessing good dry toner adhesive properties, and at least one crosslinked polymer possessing hot fuser roll embossing resistance.

Additionally, the present invention provides for electrophotographic imaging processes, utilizing the inventive electrophotographic copying and printing media provided for herein.

In order to assist those desiring to practice the present invention, the following glossary of terms is provided, in order to remove any ambiguity which may exist as to the meaning of such terms as used herein.

The term "electrophotographic copying" as used herein, means electrophotographic copying which utilizes image-wise light exposure onto a photoconductive drum or belt, followed by toning and fixing of the image.

The term "polymeric substrate" as used herein, refers to those polymeric substrates (transparent or opaque) generally understood by those skilled in the art to be useful in preparing electrophotographic copies and/or prints. Suitable polymeric supports include heat resistant polymeric substrates such as polyethylene terephthalate, polycarbonates, polysulfones, polyimides, filled polyethylene terephthalate, or the like. Most preferred as polymeric substrates are polyethylene terephthalate substrates with a cross- and transdirection shrinkage of less than 0.9% when maintained at 150° C. for 30 minutes.

The term "thermoplastic polymer" as used herein, means a thermoplastic polymer which may be useful in promoting toner adhesion, which can be dissolved or dispersed in water or solvent, and which can be deposited on a suitable polymeric substrate to form a non-tacky coating, and which still possesses good affinity for toner. The thermoplastic polymer chosen should possess a glass transition temperature (Tg) of 5° to 75° C. (preferably 15°-55° C.), in order to ensure adequate toner adhesion. The thermoplastic polymer may be electrically conductive or non-conductive.

The term "crosslinked polymer possessing hot fuser roller embossing resistance" refers to crosslinked polymers which are present in the matrix layers of the present invention and which render the matrix layers of the present invention heat resistant enough to prevent hot fuser roll embossing of the film media herein disclosed, during electrophotographic processing. The crosslinked polymer may be electrically conductive or non-conductive and should not adversely affect the good toner affinity of the thermoplastic polymer.

The term "non-polymeric electrically conductive agent" as used herein, refers to electrically conductive agents, which possess surface resistivities of from about $1\times10^5$ to $1\times10^{14}$ ohms per square, in the neat form and which are non-polymeric.

The term "particulate" as used herein, refers to particles possessing a size (diameter) within the range of about 1 to 50 microns. Such particles may be transparent or opaque.

DETAILED DESCRIPTION OF THE INVENTION

The following detailed description is meant to aid those skilled in the art, desiring to practice the present invention. The following description, however, is not to be construed as limiting the present invention, or the subject matter encompassed thereby. In this regard, it is noted that those skilled in the art should readily recognize that certain equivalent materials, procedures, and embodiments other than those described herein, may be used without departing from the spirit or the scope of the present invention, or the subject matter encompassed thereby.

The dry toner imaging media of the present invention are prepared by forming on a suitable polymeric substrate a matrix layer which imparts good anti-static properties, toner adhesion, embossing resistance, and imaging quality to the substrate. Such layers are formed on the polymeric film substrate, by first applying an appropriate coating composition to the substrates and then drying the coating layer to effect crosslinking of appropriate crosslinkable polymers therein.

Coating compositions useful in preparing the copying and printing media of the present invention are preferably aqueous-based formulations, which include the following chemical components: (a) at least one thermoplastic polymer which possesses good toner affinity, and possesses a Tg of from about 5° to 75° C., and which may be conductive; (b) a crosslinkable polymer, which when crosslinked, possesses good hot fuser roll embossing resistance, and which may be conductive; (c) an appropriate crosslinking agent system; and (d) optionally, a particulate; in an appropriate aqueous or organic solvent system or blends thereof.

While the coating compositions of the present invention are preferably aqueous-based formulations, it is envisioned that water-miscible solvents, such as alcohols, glycol ethers and ketones, including methanol, isopropanol, Methyl Cellosolve and acetone or the like, may also be used to form such aqueous-based solvent systems in concentrations up to about at least 50% w/w. Dependent upon the solvent system utilized, one may additionally provide for coalescent agents, antifoam compounds, flow agents and the like in the coating formulation prepared, such ingredients being generally provided for in the art to prepare coating formulations.

The different chemical components and amounts thereof contained in the coating compositions used to prepare the present inventive copying media, of course, can be varied, while still producing the copying and printing media encompassed hereby. Examples of some of the possible variations which one might utilize in preparing coating compositions for forming the copying and printing media of the present invention, are as follows.

Regarding the thermoplastic polymer present in the matrix layer of the copying and printing media of the present invention, suitable polymers include those listed below. The thermoplastic polymers are generally present in the coating compositions disclosed herein in an amount of about 20–80% w/w based upon the total solid weight of the coating composition prepared and may be electrically conductive, if desired. The thermoplastic polymer chosen should have a glass transition temperature (Tg) of from 5° to 75° C. (preferably 15°–55° C.), and preferably it should be in the form of a latex or be water-soluble (>pH 7). Moreover, it should be selected so that zero or minimal crosslinking occurs therewith during drying of the matrix layers herein disclosed. In such a manner, one can easily ensure that the matrix layers of the film media of the present invention always possess good toner affinity.

Suitable non-conductive thermoplastic resins to be used in the present invention include those employed in toners used in electrophotographic copying processes; for example, styrene-acrylate, styrene-butadiene, polyester, epoxy, n-butyl methacrylate, iso-butyl methacrylate, or the like are useful in the present invention. Preferably, the non-conductive thermoplastic polymers are synthetic polymers in the form of a latex or in a water-soluble form. Examples of such preferred thermoplastic polymers are styrene-acrylate latex, styrene-butadiene latex, dispersions of polyester and epoxies, and dispersions of n- or iso-butyl methacrylate. Most preferably, the thermoplastic nonconductive polymer is a styrenated-acrylate latex.

Exemplary of suitable electrically conductive thermoplastic polymers that may be useful in the present invention are sulphonated poly (α-methyl styrene), quaternized soft styrenated acrylics, and the like. If a thermoplastic polymer is electrically conductive, it should preferably possess a surface resistivity of from $1\times10^5$ to $1\times10^{14}$ ohms per square at 20° C. and 50% RH in its neat form.

The crosslinked polymer, possessing hot fuser roll embossing resistant properties, present in the matrix layer of the copy media of the present invention, is generally present in the coating compositions used to prepare such media in a crosslinkable form in an amount of about 7–80% w/w based upon the total solid weight of the coating composition prepared. The amount of the crosslinkable polymer is preferably in the range of about 15–50% w/w, based upon the total solid weight of the coating composition. Suitable crosslinkable polymers to use in the present invention include many non-conductive crosslinkable polymers as well as many electrically conductive polymers. The crosslinkable polymers encompassed hereby are preferably water-soluble or in emulsion form and if conductive, preferably possess a surface resistivity of about $1\times10^5$ to $1\times10^{14}$ ohms per square at 20° C. and 50% RH in their neat form.

Suitable electrically conductive polymers which provide good embossing resistance to the matrix layer, when crosslinked, include cationic polymers such as dimethyl diallyl ammonium chloride, dimethyl diallyl ammonium chloride/diacetone acrylamide copolymers, dimethyl diallyl ammonium chloride/n-methanol acrylamide copolymers, polyvinyl benzyl trimethyl ammonium chloride, polyethylenimine hydrochloride, poly(2-acryloxyethyldimethyl) sulfonium chloride, poly(-glycidyl) tributyl phosphonium chloride, cationic cellulosic ethers, and the like. Most preferred as cationic conductive crosslinkable polymers useful in the present invention are the cationic cellulosic quaternary polymers, especially when used in conjunction with anionic styrenated acrylic latices. Preferably, the ionically conductive cellulosic polymers are Celquat L-200 or Protorez CAT from National Starch and Chemical and Polymer LR-30M from Amerchol (Union Carbide).

Likewise, suitable anionic conductive polymers which provide good embossing resistance to the matrix layer, when crosslinked, include alkali metal and ammonium salts of poly (styrene sulfonic acid), sulfonated styrene/maleic anhydride copolymer, poly (acrylic acid), poly (methacrylic acid), poly (vinyl phosphate) and free acids thereof, or the like. Most preferred as an anionic polymeric conductive agent in the present invention is the sulfonated styrene maleic anhydride copolymer, which is known by the trade name of VERSA TL-4 and is commercially available from National Starch and Chemical Company.

The foregoing examples of cationic and anionic conductive polymers in an amount of about 1–33% w/w based on the solid weight of the coating composition are also effective in achieving the requisite resistivity or anti-static properties disclosed herein, even when they are used without being crosslinked. In such cases, the embossing resistance of the matrix layer is achieved by the use of another polymer(s), which is crosslinked and which may or may not also be conductive.

Non-conductive crosslinkable polymers which may also be used in the present invention to produce crosslinked polymers having good hot fuser roll embossing resistance, include those having functional groups such as —OH, —COOH and —$CONH_2$, and include melamine-formaldehyde, urea-formaldehyde, phenol-formaldehyde, unsaturated polyester, phenoxy, acrylamide and epoxy polymers, including methyl methacrylate/hydroxyl methacrylate copolymers, cellulosics, starch and hydroxy or carboxy functional polymers of styrene, vinyl, acrylic, polyether, acetal, and acrylic-styrene resins.

Suitable crosslinking agent systems, which may also be used in the present invention, include those crosslinking agents such as listed below, optionally in combination with a catalyst such as those disclosed below. The crosslinking agent systems are used in the media of the present invention, to effect crosslinking of the crosslinkable polymers, which possess good hot fuser roll embossing resistance, so that the same are present in the matrix layers of the inventive media herein disclosed.

The crosslinking agent systems are generally present in the coating compositions in an amount of about 3-50% w/w based upon the total weight of the crosslinkable polymers possessing good hot fuser roll embossing resistance, which are present in the coating compositions. The percentage of the crosslinking agent systems utilized preferably is dependent upon the amount and type of the crosslinkable polymers present. Even so, whatever amount of the crosslinking agent systems is utilized in the coating composition prepared, the amount and type should be appropriate to ensure proper embossing resistance of the copying and printing media of the invention, while not adversely affecting the ability of the thermoplastic polymer in the matrix layer thereof to provide good toner adhesion.

Suitable crosslinking agent systems which are useful in the present invention include aldehydes, such as formaldehyde, melamine formaldehyde resins and urea formaldehyde resins; isocyanates; blocked isocyanates; and the like. Preferred crosslinking agents to use in the present invention are thought to be the melamine formaldehyde resins.

Considerations which can affect the choice of an appropriate crosslinking agent, as well as the amount present, will include functional groups occurring on the polymer, which will be crosslinked (e.g., —OH, —COOH and —$CONH_2$), whether a catalyst is utilized in the crosslinking system and its concentration, and desired cure time and temperature for the matrix layer.

Catalysts which may use a crosslinking agent system as herein disclosed, include those listed below. Such catalysts, when utilized, are preferably present in the coating compositions in an amount of about 0.1-10% w/w based upon the total solid weight of the coating composition. This amount is included in the percentage of the crosslinking agent system present in the coating compositions herein disclosed.

Suitable catalysts to use in the crosslinking agent systems encompassed by the present invention include acids or blocked acids when aldehydes are utilized as crosslinking agents, and organic tin compounds when isocyanates are utilized as crosslinking agents. The most preferred catalysts to use in the present invention, when aldehydes are utilized as crosslinking agents, are blocked acids such as ammonium nitrate.

Preferably, catalysts are utilized in the crosslinking agent systems, in order to facilitate initiation of desired crosslinking in the matrix layer of the media of the present invention. However, the crosslinking agent systems may also comprise one or more crosslinking agents without a catalyst being present, if so desired.

It is noted that common methods for the testing of crosslinking may be employed to ascertain if adequate crosslinking has occurred in the matrix layer of the film media herein disclosed. Such methods include testing for solvent resistance, hardness, and printing or blocking resistance in the media produced. It is preferable to test the crosslinking by solvent resistance and printing resistance techniques in the instance of the copying and printing media of the present invention.

In one embodiment of the present invention, all polymers in a matrix layer may be non-conductive, if in conjunction therewith a non-polymeric electrically conductive agent is also used. Even so, the use of such non-polymeric electrically conductive agents in the present invention is not limited to such an instance, and the use thereof in combination with at least one electrically conductive polymer, herein encompassed, is fully contemplated.

Suitable non-polymeric electrically conductive agents for use in the present invention include: conductive doped zinc oxide and doped titanium oxide, cuprous iodide, silver iodide and the like.

Particulates may also be used in the matrix layers of the film media of the present invention and may also be present in the coating compositions utilized to prepare such media. Choice of an appropriate particulate, of course, is based upon the substrate to be coated and the desired outcome. For example, one would most desirably use substantially transparent particulates when preparing an overhead transparency. However, opaque pigments can also be used as particulates in appropriate circumstances (e.g., when the polymeric substrate is opaque). When used, particulates are preferably present in the coating solutions in an amount of 0.1-10% w/w based upon the total solid weight of the formulation for coating overhead transparencies and 0.1-50% w/w when using an opaque substrate.

Particulates useful in the present invention should preferably aid in adjusting the coefficient of friction between two polymeric substrates, and preferably should also possess a particle size (diameter) range of from about 1 to 50 microns. When preparing transparent media, such particles can be waxes, fluorinated polymers, polyethylene, polypropylene, polystyrene, polyacrylates, urea-formaldehyde, silica, or the like. One preferred, substantially transparent particulate to use in the present invention is polyethylene, especially with a particle size of from 2 to 40 microns in diameter. Suitable opaque pigments which can be used in appropriate circumstances include calcium carbonate, kaolin, calcined clay, aluminum hydroxide, titanium oxide, zinc oxide, barium sulfate, lithophone, or the like. Such pigments can often give increased recoatability, abrasion resistance, slip, and anti-blocking properties to the copying and printing media prepared.

The coating compositions discussed above, may be applied to suitable substrates, as defined herein, by utilizing techniques generally understood by those skilled in the art. Such methods include, for example, applying the coating compositions to a polymeric substrate by use of roller coating, rod coating, dip-coating, air-knife coating, slide coating, curtain coating, doctor coating, flexographic coating, gravure coating, or a like technique.

After the coating is applied to the polymeric substrate, the coating is dried at a temperature of about 120° to 150° C. for a time of about 30 to 120 seconds. During the drying step, crosslinking in the coating occurs, so that there is formed an anti-static matrix layer on the polymeric substrate, as discussed herein. Accordingly, a film medium of the present invention is thus prepared.

The present invention provides that the matrix layers of the film media of the present invention possess a blocking resistance at 70° C. after 30 minutes. A suitable procedure for testing to see if such blocking resistance is present in a prepared film medium is as follows:

1. Cut 2"×2" squares of unexposed film.
2. Stack two of the squares together, being careful to keep the coated side face to face. Repeat to make a second set.
3. Place a 2"×2" square of raw polyester film on the top and bottom of the stack and also between the two sets.
4. Place the stack of squares between glass plates in a 78° C. oven.
5. Place a 12 lb. (5.45 kg) weight on top of the glass plate.
6. Remove the stack from the oven after 30 minutes.
7. Let the squares cool for 5 minutes.
8. Separate the squares and observe.

Acceptable values using the above procedure occur when no sticking or blocking between the pair of squares takes place.

The present invention further provides that the matrix layers of the film media of the present invention possess a surface resistivity of from $1\times10^{8}$ to about $1\times10^{14}$ ohms per square, when measured at 20° C. and 50% relative humidity, as per ASTM D257-90. In this regard, the surface resistivity of a tested matrix layer is numerically equal to the surface resistance between two electrodes forming opposite sides of a square. The size of the square is immaterial.

The following Examples are provided in order to more fully illustrate different embodiments and methods of production, for the inventive electrophotographic copy and printing media of the present invention. The Examples, however, should not be construed as limiting to the present invention, since many variations may be made therein, without departing from the spirit or scope of the present invention.

EXAMPLE 1

A coating composition having the following formula was prepared:

| | |
|---|---|
| Water | 82.58 Kg |
| Isopropanol | 2.40 |
| CYMEL 325[1] | 1.05 |
| Polyethylene powder particulates | .21 |
| CELQUAT L-200[2] | 1.35 |
| ADCOTE 61 JH 64A (40%)[3] | 12.00 |
| Ammonium Nitrate | .41 |
| | 100.00 Kg |

[1]Melamine-formaldehyde sold by American Cyanamid Company
[2]Ionically conductive cellulosic polymer sold by National Starch and Chemical
[3]Styrene-acrylate latex sold by Morton International The polyethylene was dispersed in the water, isopropanol and CYMEL 325 before the CELQUAT L-200 was dissolved. The ADCOTE 61 JH 64A was then mixed into the solution and the ammonium nitrate was added just before the coating was applied to 100 micron thick transparent polyethylene terephathalate film substrates. The coating solution was dried at 130° C. for 1 minute to give a dry toner imaging medium according to the present invention.

EXAMPLE 2

Utilizing the coating composition of Example 1, both sides of a 100 micron thick opaque, filled polyethylene terephthalate polymeric flat substrate are coated. The coated substrate is then dried at 130° C. for 1 minute per side to give an electrostatic copying and printing medium, which comprises an opaque, filled polyethylene terephthalate polymeric substrate coated on both sides by an anti-static film which possesses a surface resistivity of between about $1\times10^{8}$ and $1\times10^{14}$ ohms per square, when tested at 20° C. and 50% relative humidity, and which possesses excellent dry toner adhesive properties and hot fuser embossing resistance properties.

EXAMPLE 3

Utilizing the coating composition of Example 1, one side of a 100 micron thick flat transparent polyethylene terephthalate polymeric substrate is coated to provide the polymeric substrate with a thin film coating after drying at 130° C. for 1 minute, while a pressure sensitive paperbacking is attached to the other side. The coating has a surface resistivity of between about $1\times10^{8}$ a to $1\times10^{14}$ ohms per square, when measured at 20° C. and 50% relative humidity, and the film has excellent dry toner adhesive properties as well as excellent hot fuser embossing resistant properties.

EXAMPLE 4

Utilizing the electrophotographic copying media prepared in Example 1, a copying process according to the present invention was performed. Specifically, the coated films were imaged in a XEROX 1075 copier (70 copies per minute) with excellent toner adhesion and imaged in a XEROX 1025, hot fuser roll copier (21 copies per minute) without significant surface embossing.

EXAMPLE 5

When the electrophotographic copying media of Examples 2 or 3 are utilized in a XEROX Model 1075 or 1025 copier, as an electrophotographic copying medium, electrophotographic copies are obtained which possess excellent toner adhesion and no significant surface embossing.

EXAMPLE 6

A coating composition having the following formula was prepared:

| | |
|---|---|
| Water | 82.73 kg |
| IPA (Isopropyl Alcohol) | 2.40 |
| CYMEL 325 | 1.05 |
| Polyethylene powder particulates | .21 |
| CELQUAT L-200 | 1.35 |
| ADCOTE 61JH64A (40%) | 6.0 |
| TEXIGEL 13-0111 (41%)[1] | 5.85 |
| Catalyst | .41 |
| | 100.0 kg |

[1]Carboxylated styrene-acrylate latex sold by Scott Bader.

Utilizing the same procedure as Example 1, an electrophotographic copying and printing medium was obtained according to the present invention.

EXAMPLE 7

A coating composition having the following formula was prepared:

| | |
|---|---|
| Water | 67.0 kg |
| CYMEL 325 | 1.05 |
| Polyethylene powder particulates | .21 |
| ADCOTE 61JH64A (40%) | 6.0 |
| EASTMAN AQ38D (25%)[1] | 9.6 |
| VERSA TL-4(25%)[2] | 4.8 |
| Catalyst | .41 |
| | 89.07 kg |

[1]Hydroxylated and carboxylated polyester in dispersion form sold by Eastman Chemical Products, Inc.
[2]Sulfonated styrene maleic anhydride copolymer sold by National Starch and Chemical Company.

Utilizing the same mix and coating procedure of Example 1, an opaque, filled polyethylene terephthalate polymeric substrate is coated on both sides to give an electrophotographic copying and printing medium according to the present invention.

As can be seen from the above Examples, the coating media of the present invention solve problems which were encountered in the prior art in the electrophotographic printing and copying arts. The media of the present invention reliably feed through electrophotographic copying and printing machines, possess good anti-static properties, have good toner adhesion, are resistant to embossing, produce images of good quality, and moreover, possess characteristics which provide reliable feed and enable ease in handling and stacking. Such a combination of properties has not been heretofore advantageously achieved in printing and copy film media, without associated drawbacks in at least some desirable qualities.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A film medium useful in dry toner imaging processes, which film comprises a transparent or opaque polymeric substrate, having on at least one side thereof a matrix layer possessing resistance to blocking at 78° C. after 30 minutes and a surface resistivity of from about $1\times10^8$ to about $1\times10^{14}$ ohms per square when measured at 20° C. and 50% relative humidity, said matrix layer comprising a mixture of about 20 to 80% w/w of at least one thermoplastic polymer having a Tg of 5° to 75° C. and about 7 to 80% w/w of at least one crosslinked polymer possessing hot fuser roll embossing resistant properties, wherein at least one polymer in said matrix layer is electrically conductive.

2. A film medium useful in dry toner imaging processes, which film comprises a transparent or opaque polymeric substrate, having on at least one side thereof a matrix layer possessing resistance to blocking at 78° C. after 30 minutes and possessing a surface resistivity of from about $1\times10^8$ to about $1\times10^{14}$ ohms per square when measured at 20° C. and 50% relative humidity; said matrix layer comprising a non-polymeric electrically conductive agent, a mixture of about 20 to 80% w/w of at least one thermoplastic polymer having a Tg of from 5° to 75° C. and about 7 to 80% w/w of at least one crosslinked polymer possessing hot fuser roll embossing resistance.

3. The film medium of claim 1, wherein at least one of said crosslinked polymers is electrically conductive.

4. The film medium of claim 1, wherein at least one of said thermoplastic polymers is electrically conductive.

5. The film medium of claim 1, wherein at least one of said thermoplastic polymers and at least one of said crosslinked polymers are electrically conductive.

6. The film medium of claim 2, wherein at least one of said crosslinked polymers is electrically conductive.

7. The film medium of claim 2, wherein at least one of said thermoplastic polymers is electrically conductive.

8. The film medium of claim 2, wherein at least one of said thermoplastic polymers and at least one of said crosslinked polymers are electrically conductive.

9. The film medium of claim 1, wherein said thermoplastic polymer is non-conductive and is selected from the group consisting of styrenated-acrylate, styrenebutadiene, polyester, epoxy, n-butyl methacrylate and isobutyl methacrylate polymers.

10. The film medium of claim 1, wherein at least one of said crosslinked polymers is a crosslinked cationic electrically conductive polymer.

11. The film medium of claim 10, wherein the crosslinked cationic polymer is a cationic cellulose ether polymer, a dimethyl diallyl ammonium chloride/diacetone acrylamide copolymer, a dimethyl diallyl ammonium chloride/n-methanol acrylamide copolymer or a polyethylenimine hydrochloride.

12. The film medium of claim 11, wherein said crosslinked cationic polymer is crosslinked with an aldehyde, isocyanate or blocked isocyanate.

13. The film medium of claim 1, wherein at least one of said crosslinked polymers is a crosslinked anionic electrically conductive polymer.

14. The film medium of claim 13, wherein the anionic conductive polymer is a crosslinked alkali metal salt of poly(styrene sulfonic acid), a crosslinked ammonium salt of poly(acrylic acid), a crosslinked poly(methacrylic acid), a crosslinked sulfonated styrene/maleic anhydride copolymer or a crosslinked free acid thereof.

15. The film medium of claim 14, wherein the crosslinked anionic conductive polymer is crosslinked with an aldehyde, isocyanate or blocked isocyanate.

16. The film medium of claim 1, wherein said polymeric substrate is a temperature resistant substrate comprising a polyethylene terephthalate, a polycarbonate, a polysulfone or a polyimide.

17. The film medium of claim 1, wherein said polymeric support is opaque and comprises a filled polyethylene terephthalate.

18. The film medium of claim 1, wherein said matrix layer further comprises 0.1 to 50% w/w of a particulate, having a particle size range of from about 1–50 microns, the particulate comprising a wax, a fluorinated polymer, polyethylene, polypropylene, polystyrene, polyacrylate, urea-formaldehyde, silica, calcium carbonate, kaolin, calcined clay, aluminum hydroxide, titanium oxide, zinc oxide, barium sulfate, or lithophone.

19. The film medium of claim 18, wherein said particulate is substantially transparent and has a particle size range of 2–40 microns and comprises polyethylene.

20. The film medium of claim 2, wherein said matrix layer further comprises 0.1 to 50% w/w of a particulate, having a particle size range of from about 1–50 microns, the particulate comprising a wax, a fluorinated polymer, polyethylene, polypropylene, polystyrene, polyacrylate, urea-formaldehyde, silica, calcium carbonate, kaolin, calcined clay, aluminum hydroxide, titanium oxide, zinc oxide, barium sulfate, or lithophone.

21. The film medium of claim 20, wherein said particulate is present in an amount of 0.1 to 10% w/w, is substantially transparent and has a particle size range of 2–40 microns and comprises polyethylene.

22. In a dry toner imaging process, an improved electrophotographic film medium, comprising:

a transparent or opaque polymeric substrate, having on at least one side thereof a matrix layer possessing resistance to blocking at 78° C. after 30 minutes and a surface resistivity of from about $1\times10^8$ to about $1\times10^{14}$ ohms per square when measured at 20° C. and 50% relative humidity, said matrix layer comprising a mixture of about 20 to 80% w/w of at least one thermoplastic polymer having a Tg of 5° to 75° C. and about 7 to 80% w/w of at least one crosslinked polymer possessing hot fuser roll embossing resistant properties, wherein at least one polymer in said matrix layer is electrically conductive.

23. In a dry toner imaging process, an improved electrophotographic film medium, comprising:

a transparent or opaque polymeric substrate, having on at least one side thereof a matrix layer possessing resistance to blocking at 78° C. after 30 minutes and a surface resistivity of from about $1\times10^8$ to about $1\times10^{14}$ ohms per square when measured at 20° C. and 50% relative humidity, said matrix layer comprising a nonpolymeric electrically conductive agent, a mixture of about 20 to 80% w/w of at least one thermoplastic polymer having a Tg of 5° to 75° C. and about 7 to 80% w/w of at least one crosslinked polymer possessing hot fuser roll embossing resistance.

24. The dry toner imaging process of claim 22, wherein at least one of said crosslinked polymers is electrically conductive.

25. The dry toner imaging process of claim 22, wherein at least one of said thermoplastic polymers is electrically conductive.

26. The dry toner imaging process of claim 22, wherein at least one of said thermoplastic and at least one of said crosslinked polymers are electrically conductive.

27. The dry toner imaging process of claim 23, wherein at least one of said crosslinked polymers is electrically conductive.

28. The dry toner imaging process of claim 23, wherein at least one of said thermoplastic polymers is electrically conductive.

29. The dry toner imaging process of claim 23, wherein at least one of said thermoplastic and at least one of said crosslinked polymers are electrically conductive.

30. The dry toner imaging process of claim 22, wherein the matrix layer further comprises 0.1 to 50% w/w of a particulate, having a particle size range of from about 1–50 microns, the particulate comprising a wax, a fluorinated polymer, polyethylene, polypropylene, polystyrene, polyacrylate, urea-formaldehyde, silica, calcium carbonate, kaolin, calcined clay, aluminum hydroxide, titanium oxide, zinc oxide, barium sulfate, or lithophone.

31. The dry toner imaging process of claim 30, wherein said particulate is present in an amount of 0.1 to 10%, is substantially transparent and has a particle size range of 2–40 microns and comprises polyethylene.

32. The dry toner imaging process of claim 23, wherein the matrix layer further comprises 0.1 to 50% w/w of a particulate, having a particle size range of from about 1–50 microns, the particulate comprising a wax, a fluorinated polymer, polyethylene, polypropylene, polystyrene, polyacrylate, urea-formaldehyde, silica, calcium carbonate, kaolin, calcined clay, aluminum hydroxide, titanium oxide, zinc oxide, barium sulfate, or lithophone.

33. The dry toner imaging process of claim 32, wherein said particulate is present in an amount of 0.1 to 10% w/w, is substantially transparent and has a particle size range of 2–40 microns and comprises polyethylene.

34. A film medium useful in dry toner imaging processes, which film comprises a transparent or opaque polymeric substrate, having on at least one side thereof a matrix layer possessing resistance to blocking at 78° C. after 30 minutes and a surface resistivity of from about $1\times10^8$ to about $1\times10^{14}$ ohms per square when measured at 20° C. and 50% relative humidity; said matrix layer comprising an electrically conductive polymer, about 20 to 80% w/w of a thermoplastic polymer having a Tg of 5° to 75° C., and about 7 to 80% w/w of a crosslinked polymer possessing hot fuser roll embossing resistance.

* * * * *